United States Patent [19]
Humbek et al.

[11] Patent Number: 5,851,058
[45] Date of Patent: Dec. 22, 1998

[54] TENSIONER FOR TRACK OF TRACKED VEHICLE

[75] Inventors: Holger Humbek, Bochum; Heinz-Dieter Krämer, Iserlohn, both of Germany

[73] Assignee: Intertractor Aktiengesellschaft, Gevelsberg, Germany

[21] Appl. No.: 728,952

[22] Filed: Oct. 11, 1996

[30] Foreign Application Priority Data

Oct. 13, 1995 [DE] Germany .......................... 195 38 222.6

[51] Int. Cl.⁶ .................................................. B62D 55/30
[52] U.S. Cl. .......................................... 305/146; 305/152
[58] Field of Search .................................. 305/125, 143, 305/145, 146, 151, 152, 153, 154

[56] References Cited

U.S. PATENT DOCUMENTS

| | | | |
|---|---|---|---|
| 2,506,619 | 5/1950 | Schwartz | 305/152 |
| 3,008,772 | 11/1961 | Helsel, Sr. | 305/146 |
| 3,826,543 | 7/1974 | Muller | 305/146 |
| 4,143,898 | 3/1979 | Klaus . | |
| 4,650,259 | 3/1987 | Alexander et al. | 305/146 |

FOREIGN PATENT DOCUMENTS

| | | | |
|---|---|---|---|
| 1190344 | 4/1965 | Germany | 305/152 |
| 27 58 856 | 7/1979 | Germany . | |
| 40 25 929 | 2/1992 | Germany . | |
| 1 466 133 | 3/1977 | United Kingdom . | |

OTHER PUBLICATIONS

"Roloff/Matek Maschinenelemente"; Matek et al; Publ.Friedr.Vieweg & Sohn, Braunschweig/Wiesbaden,Germany,1963; 5 pages.

"Reibungsfedern Ringfeder Im Maschinebau";(Auszug aus Katalog R 60) Katalog R 56, Ausgabe Jul. 1993; 6 pages.

*Primary Examiner*—Russell D. Stormer
*Attorney, Agent, or Firm*—Herbert Dubno; Andrew Wilford

[57] ABSTRACT

A tensioning device has an inner end plate mounted on a frame, a sleeve fixed to the end plate and extending along an axis toward an idler wheel over which is spanned a flexible endless element (e.g. a drive chain or conveyor belt), and an axially compressible stack of inner and outer spring rings. The stack is closely surrounded by the sleeve, forms an annular friction spring, and has one end bearing axially on the plate and an opposite end. An outer end plate bears axially toward the frame end plate on the opposite end of the annular friction spring, and a hydraulic unit is braced axially between the outer end plate and the idler wheel. The inner spring rings have substantially frustoconical outer surfaces and the outer spring rings have substantially frustoconical inner surfaces engaging the outer surfaces of the inner rings.

8 Claims, 3 Drawing Sheets

TENSIONER FOR TRACK OF TRACKED VEHICLE

FIELD OF THE INVENTION

The present invention relates to a tracked vehicle. More particularly this invention concerns a tensioner for the track of a tracked vehicle.

BACKGROUND OF THE INVENTION

As described in German patent documents 2,758,586 and 4,025,929, in British patent 1,466,133, and U.S. Pat. No. 4,143,898 a tensioner for an endless flexible element, for instance a tracked-vehicle track chain, normally comprises an idler wheel over which the element is spanned and a biasing unit braced between a fork carrying the idler wheel and the vehicle or machine frame. Typically the biasing unit comprises a hydraulic device like a shock absorber, and a massive spring unit that together exert a considerable force on the element to keep it tight.

The spring unit can have a coil spring but it is normally difficult to get the stiffness needed with such a spring, so recourse is had to elastomeric blocks. Unfortunately the modulus of elasticity of such elements is extremely temperature dependent, so that when such a unit gets warm it becomes excessively soft. The use of nitrogen-filled pneumatic units has therefore been suggested, but leakage problems make such systems relatively service prone.

OBJECTS OF THE INVENTION

It is therefore an object of the present invention to provide an improved tensioner for an endless flexible element.

Another object is the provision of such an improved tensioner for an endless flexible element which overcomes the above-given disadvantages, that is which offers a very stiff spring characteristic but that is of simple construction so that it can be counted on to have a long service life.

SUMMARY OF THE INVENTION

A tensioning device has according to the invention an inner end plate mounted on a frame, a sleeve fixed to the end plate and extending along an axis toward an idler wheel over which is spanned a flexible endless element (e.g. a drive chain or conveyor belt), and an axially compressible stack of inner and outer spring rings. The stack is closely surrounded by the sleeve, forms an annular friction spring, and has one end bearing axially on the plate and an opposite end. An outer end plate bears axially toward the frame end plate on the opposite end of the annular friction spring, and a hydraulic unit is braced axially between the outer end plate and the idler wheel.

This system therefore uses a so-called ring spring of the type sold by Ringfeder GmbH and described in *Maschinenelemente* (Ed.: Matek, Muhs, & Wittel; Publ.: Friedr. Vieweg & Sohn, Braunschweig, Wiesbaden, Germany; 1963). In such a spring unit the inner spring rings have substantially frustoconical outer surfaces with a conicity of 12° to 15° and the outer spring rings have substantially frustoconical inner surfaces engaging the outer surfaces of the inner rings. When compressed the outer rings are forced to expand radially while the inner rings are compressed radially to give a very stiff spring characteristic that is largely insensitive to temperature. Using the dimensions of a standard tensioner, it is possible to exert 750 kN of force with the system of this invention, with peak loads of 5000 kN being tolerable when the system is bottomed.

There are at least eight outer rings. Normally the end rings are half rings. The sleeve snugly surrounds the spring stack so that not only does this sleeve keep grit and the like out of the lubricant on the spring rings, but it prevents excessive radial expansion of the outer rings, stiffening the assembly. The rings can have a diameter from 240 mm to 400 mm and the individual rings are each some 80 mm long.

According to the invention a cover plate is engaged over the sleeve at the opposite end and an outer stem on the outer end plate engages hermetically through the cover plate and is connected to the hydraulic unit, the entire interior of the sleeve being sealed in this manner. An axially extending stem has an outer end connected to the outer end plate and an inner end adjacent the inner end plate and a guide fixed at the inner end plate limits axial movement of the stem. The inner stem is provided in the guide with a radially projecting flange and the guide is tubular, surrounds the flange, and has an inwardly turned outer end axially engageable with the flange. The flange can be displaced axially on the inner stem to prestress the stack of spring rings. The tubular guide has an inner end with an axially outwardly directed end engaged between the stack and the inner end plate.

The tensioning device has according to the invention a coil spring centered on the axis and braced axially between the inner and outer end plates. This is particularly useful when the element being tensioned is the track of a tracklaying vehicle as the forces involved when the tensioner is extending are much less than those when it is being compressed, so that with the system according to the invention having a sleeve there is much less danger of component failure. A coil spring will ensure this return movement of the tensioner even if the spring rings have rusted and, therefore, stick somewhat. What is more the spring stack surrounding the coil spring contains it so that even if it breaks, its parts will remain inside the tensioner. The tensioner can also have means for introducing a lubricant into a hollow interior of the stack.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
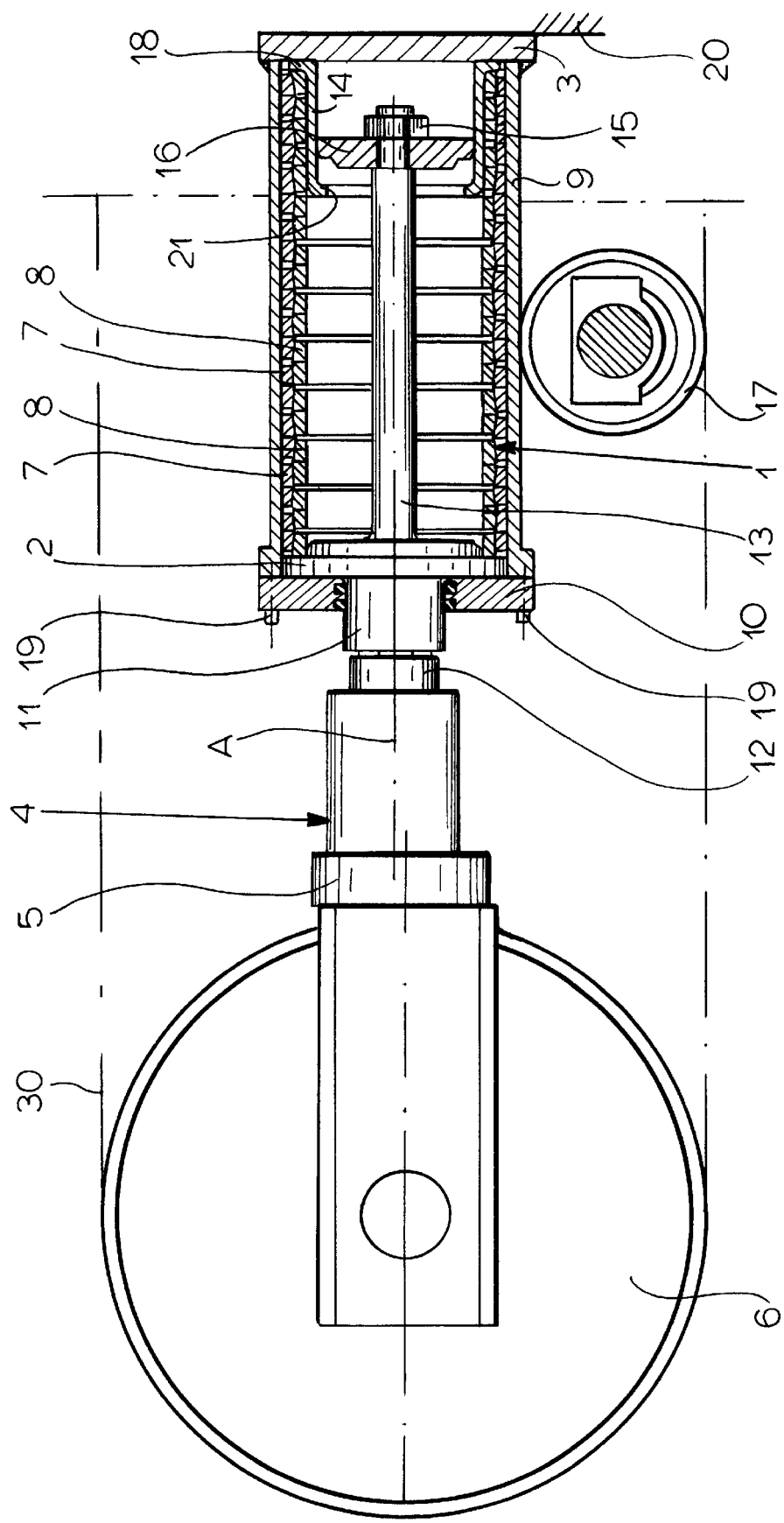
FIG. 1 is a side view partly in axial section of a tensioner according to the invention.

As seen in FIG. 1 a tensioner for a drive element 30, here a traction chain or belt, has an idler wheel 6 over which the element 30 is spanned and which is movable along an axis A relative to a schematically illustrated frame 20 of the vehicle carrying the element 30. The wheel 6 is held by a fork 5 carried on the outer end of a hydraulic shock-absorber unit 4. A guide wheel 17 rotatable about an axis parallel to the axis of the wheel 6 is mounted underneath the unit to guide the element 30.

An inner end plate 3 fixed in the FIG. 1 embodiment to the vehicle frame 20 is welded to the inner end of a sleeve 9 to whose outer end an annular cover plate 10 is secured by bolts 19. A prestressed stack 1 of ten outer spring rings 7 and ten (nine full and two half) inner rings 8 is snugly received in the sleeve 8 with the inner end of the stack 1 bearing on the end plate 3 and its outer end bearing on an outer end plate 2 that is reciprocal piston-fashion in the sleeve 9 along the axis A. An outer stem 11 projects through the cover plate 10 from the end plate 2 and bears on a piston rod 12 of the hydraulic unit 4. An inner stem 13 projects axially inward from the plate 2 almost to the inner end plate 3. This inner stem 13 serves primarily to prestress the spring stack 1 prior to installation in the sleeve 9.

A cylindrically tubular guide sleeve 14 coaxially received in the stack 1 at the inner end plate 3 has an outwardly directed inner end flange 18 that the innermost inner ring 8 presses against the plate 3 and an outer end formed with an inwardly directed flange or lip 21. A flange or disk 16 is secured by a nut 15 on the inner end of the stem 13 and slides like a piston in the guide sleeve 14. The length of travel of the disk 16 in the sleeve 14 is greater than the compressibility of the spring stack 1 which is about 88 mm with a wheel 6 some 1085 mm in diameter. Normally the nut 15 is tightened before insertion of the spring stack 1 into the sleeve 9 to prestress it about 5% to 10%, and after installation in the sleeve 9 the cover plate 10 is installed to increase this prestressing to about 50%, making the unit 1 very stiff.

Figure 2:
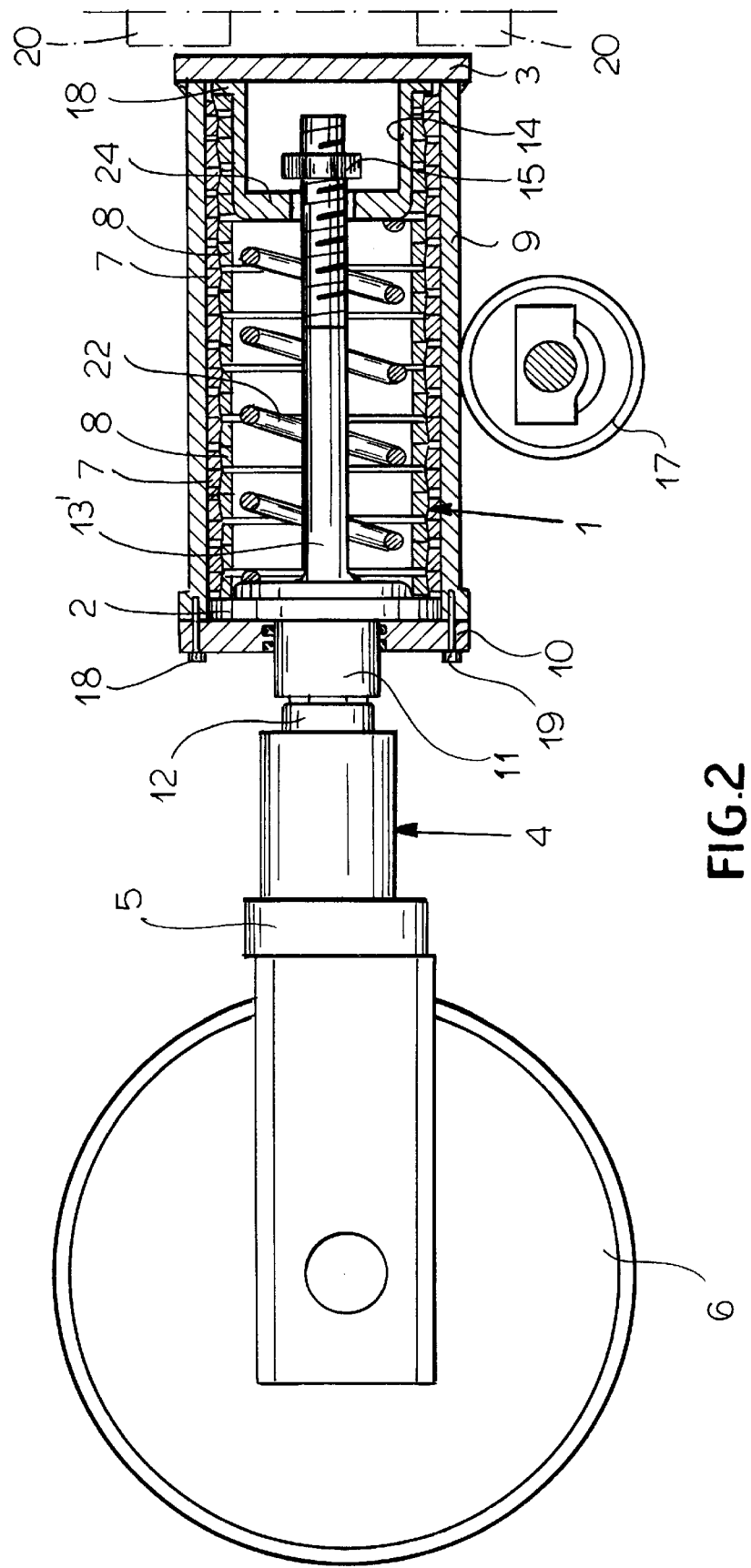
FIG. 2 is a view like FIG. 1 of another tensioner in accordance with this invention.

The arrangement of FIG. 2 is substantially identical to that of FIG. 1 except that a coil spring 22 is braced axially against the outer end plate 2 to augment the spring force of the unit 1. In addition the end plate 2 has a stem 13' that is threaded along much of its length and that carries the nut 15 that is engageable with a thickened outer end wall 24 of the guide 14. Thus this nut 15 can be tightened to prestress the spring stack 1 as well as the spring 22. The prestressed spring 22 ensures that when axial compression of the assembly is relieved it will extend smoothly, not in a jerky manner.

Figure 3:
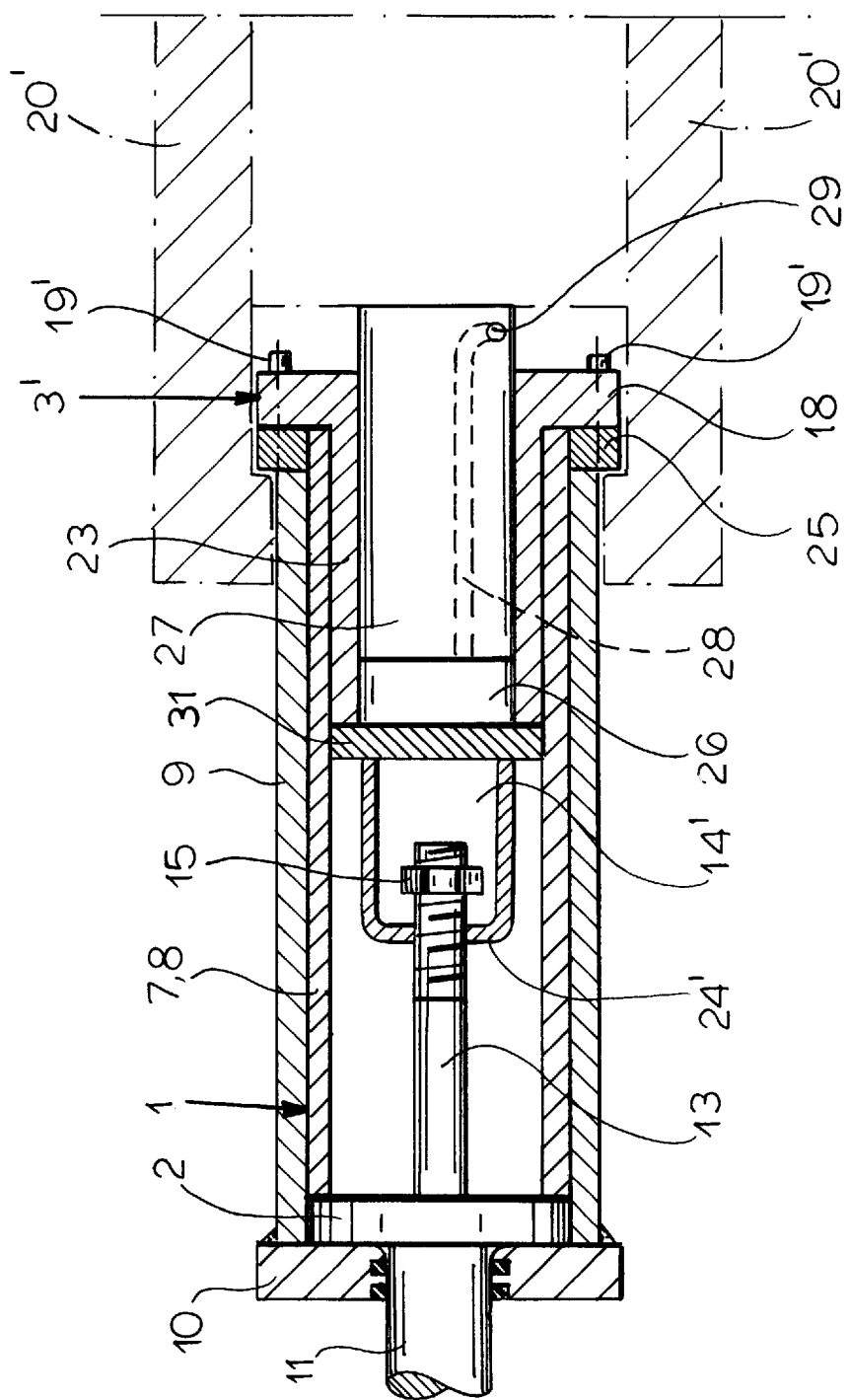
FIG. 3 is an axial section through a detail of yet another tensioner according to the invention.

In FIG. 3 an outer cover plate 20' is welded in place and an inner plate 3' is secured by bolts 19'. In addition the end plate 3' has an integral tubular extension 23 on whose end a sleeve 14' with and end wall 24' is mounted via an end plate 31. Thus this system is put together by first assembling the stack 1 between the parts 2 and 3' and then tightening the nut 15 for the desired precompression, then this subassembly is fitted into the sleeve 9 and the bolts 19' are screwed into place. The end plate 3' bears via a washer 25 on the end of the sleeve 9 and a piston 27 engages into a chamber 26 formed by the plate 3', sleeve 23, and plate 31. An axial hole 28 through the piston 27 terminates at a grease fitting 29 so that the chamber 26 can be filled with liquid whose pressure is relieved to detension the chain 30.

We claim:

1. In combination with
   a frame;
   an idler wheel displaceable relative to the frame; and
   a flexible endless element spanned over the idler wheel, a tensioning device comprising:
   an inner end plate mounted on the frame;
   a sleeve having inner and outer ends and fixed at its inner end to the inner end plate and extending along an axis toward the idler wheel;
   a cover plate at the outer sleeve end;
   an axially compressible stack of inner and outer spring rings closely surrounded by the sleeve, wholly received between the inner and outer sleeve ends, forming an annular friction spring, and having an inner end and an outer end;
   an outer end plate bearing axially toward the inner end plate directly on the outer end of the annular friction spring;
   an inner stem extending axially through the spring and having an outer end fixed to the outer end plate and an inner end adjacent the inner end plate;
   a guide on the inner end of the inner stem, the inner end of the spring bearing axially directly on the guide;
   means including a nut threaded on the inner stem and axially outwardly engageable with the guide for effectively shorting the inner stem and thereby prestressing the spring;
   means including a plurality of axially extending bolts securing the cover plate to the outer sleeve end and precompressing the annular friction spring axially between the end plates; and
   a hydraulic unit braced axially between the outer end plate and the idler wheel.

2. The tensioning device defined in claim 1 wherein the inner spring rings have substantially frustoconical outer surfaces and the outer spring rings have substantially frustoconical inner surfaces engaging the outer surfaces of the inner rings.

3. The tensioning device defined in claim 2 wherein there are at least eight outer rings.

4. The tensioning device defined in claim 2, further comprising an outer stem on the outer end plate engaging through the cover plate and connected to the hydraulic unit.

5. The tensioning device defined in claim 4 wherein the inner stem is provided in the guide with a radially projecting flange and the guide is tubular, surrounds the flange, and has an inwardly turned outer end axially engageable with the flange, the nut bearing axially outward on the flange.

6. The tensioning device defined in claim 5, wherein the guide is tubular and has an inner end with an axially outwardly directed flange engaged between the stack and the inner end plate.

7. The tensioning device defined in claim 2, further comprising
   a coil spring centered on the axis and braced axially between the inner and outer end plates.

8. The tensioning device defined in claim 2, further comprising
   means for introducing a lubricant into a hollow interior of the stack.

* * * * *